United States Patent
Chen et al.

(10) Patent No.: US 11,854,284 B2
(45) Date of Patent: Dec. 26, 2023

(54) OFFLINE HANDWRITING INDIVIDUAL RECOGNITION SYSTEM AND METHOD BASED ON TWO-DIMENSIONAL DYNAMIC FEATURES

(71) Applicant: ACADEMY OF FORENSIC SCIENCE, Shanghai (CN)

(72) Inventors: Xiaohong Chen, Shanghai (CN); Xu Yang, Shanghai (CN); Yachen Wang, Shanghai (CN); Nan Wang, Shanghai (CN); Qimeng Lu, Shanghai (CN)

( * ) Notice: Subject to any disclaimer, the term of this patent is extended or adjusted under 35 U.S.C. 154(b) by 688 days.

(21) Appl. No.: 16/969,492

(22) PCT Filed: Aug. 22, 2019

(86) PCT No.: PCT/CN2019/122178
§ 371 (c)(1),
(2) Date: Aug. 12, 2020

(87) PCT Pub. No.: WO2021/031446
PCT Pub. Date: Feb. 25, 2021

(65) Prior Publication Data
US 2023/0177857 A1    Jun. 8, 2023

(30) Foreign Application Priority Data
Aug. 22, 2019    (CN) .......................... 201910780111.1

(51) Int. Cl.
*G06V 30/32*    (2022.01)
*G06V 40/30*    (2022.01)
*G06V 30/168*    (2022.01)

(52) U.S. Cl.
CPC ............ *G06V 30/36* (2022.01); *G06V 30/168* (2022.01); *G06V 30/347* (2022.01); *G06V 40/30* (2022.01)

(58) Field of Classification Search
CPC ...... G06V 30/36; G06V 40/30; G06V 30/347; G06V 30/168
See application file for complete search history.

(56) References Cited

U.S. PATENT DOCUMENTS 9,465,985 B2 * 10/2016 Xia ...................... G06V 30/387
9,489,574 B2 * 11/2016 Lee ........................ G06V 40/18
(Continued)

*Primary Examiner* — Gregory M Desire
(74) *Attorney, Agent, or Firm* — Clement Cheng

(57) ABSTRACT

The invention provides an offline handwriting individual recognition system and method based on two-dimensional dynamic features. The method comprises: obtaining a first handwriting image corresponding to suspicious handwriting and second handwriting images corresponding to a plurality of sample handwriting; pre-processing the first handwriting image and the second handwriting images to obtain a first pre-processed image and second pre-processed images; extracting a first skeleton image and second skeleton images from the first pre-processed image and the second pre-processed images; obtaining a first writing trajectory and second writing trajectories according to the first skeleton image and the second skeleton images; extracting first dynamic features and second dynamic features according to the first writing trajectory and the second writing trajectories; performing processing to obtain a correlation coefficient between the suspicious handwriting and the sample handwriting, and performing processing to obtain an individual recognition result according to the correlation coefficient.

13 Claims, 5 Drawing Sheets

(56) References Cited

U.S. PATENT DOCUMENTS

| | | | |
|---|---|---|---|
| 9,665,768 B2* | 5/2017 | Marcelli | G06V 30/1914 |
| 10,169,670 B2* | 1/2019 | Dow | G06V 30/2276 |
| 10,354,133 B2* | 7/2019 | Chen | G06N 3/04 |
| 10,748,031 B1* | 8/2020 | Binford | G06T 7/60 |
| 11,107,254 B2* | 8/2021 | Mu | G06F 18/22 |
| 11,256,946 B2* | 2/2022 | Provencher | G06V 10/768 |

\* cited by examiner

| | |
|:---:|:---:|
| >10000 | $H_7$ |
| 1000~10000 | $H_6$ |
| 100~1000 | $H_5$ |
| 10~100 | $H_4$ |
| 1~10 | $H_3$ |
| 0.1~1 | $H_2$ |
| 0.01~0.1 | $H_1$ |
| 0.001~0.01 | $H_0$ |
| 0.0001~0.001 | $H_{-1}$ |
| <0.0001 | $H_{-2}$ |

Figure 3

OFFLINE HANDWRITING INDIVIDUAL RECOGNITION SYSTEM AND METHOD BASED ON TWO-DIMENSIONAL DYNAMIC FEATURES

BACKGROUND OF THE INVENTION

1. Field of the Invention

The invention relates to the technical field of identity recognition based on behavioral characteristics, and more particularly, to an offline handwriting individual recognition system and method based on two-dimensional dynamic features.

2. Description of the Related Art

With the development of science and technology, biometrics-based identity recognition technique continues to develop as well. Each individual has a set of measurable, or automatically recognizable and verifiable physiological characteristics or behavioral characteristics, which are unique and specific to them. The physiological characteristics comprise iris, retina, fingerprints and facial features, etc., and the behavioral characteristics comprise gait, voice and handwriting, etc. Offline handwriting individual recognition technique is a technique that the writer of the handwriting is identified by comparing and verifying the suspicious handwriting and the sample handwriting, according to a portrait, symbols, and painting shown on the papers, which are reflective of the writer's personal writing habits. Handwriting is one of the behavioral characteristics, which is unique to a person, so handwriting varies from one person to another, and each person has his/her own writing habit. Generally, handwriting imitators can only imitate the glyphs, but they can not accurately reproduce the original author's writing habit, whereby there exist some differences in the details of the imitated handwriting and the original handwriting. Therefore, thanks to the difference and uniqueness of the handwriting, the identity of the writer may be identified by measuring the characteristics of the writer's glyph, and speed, order, and pressure of the strokes.

The handwriting recognition technique comprises online and offline techniques depending on the source from which the handwriting is obtained. In particular, online handwriting recognition is able to obtain more biometric information in real time, such as, writing order, speed, pressure, angle, which may facilitate the identity recognition. However, special devices are needed to obtain those information, so the online handwriting recognition technique is limited to some specific applications and its prospect is also weakened. However, since offline handwriting is present is in the form of writing motion trajectories, that is, two-dimensional static images, the offline handwriting recognition needs to find out and extract characteristics information from the static images. In the prior art, the accuracy of the offline handwriting recognition is not high.

SUMMARY OF THE INVENTION

Given that the foregoing problems exist in the prior art, the present invention provides an offline handwriting individual recognition system based on two-dimensional dynamic features, comprising:

a data acquisition module, configured to obtain a first handwriting image corresponding to suspicious handwriting, and configured to obtain second handwriting images corresponding to a plurality of sample handwriting;

a data pre-processing module, connected to the data acquisition module, configured to pre-process the first handwriting image to obtain a first pre-processed image corresponding to the suspicious handwriting, and configured to pre-process each of the second handwriting images to obtain second pre-processed images corresponding to each of the plurality of sample handwritings;

a skeleton extraction module, connected to the data pre-processing module, configured to perform skeleton extraction on the first pre-processed image to obtain a first skeleton image corresponding to the suspicious handwriting; and configured to perform skeleton extraction on each of the second pre-processed images to obtain second skeleton images corresponding to each of the plurality of sample handwritings;

wherein the first skeleton image and each of the second skeleton images have a line width of a single pixel;

a stroke order recognition module, connected to the skeleton extraction module, configured to perform handwriting tracking according to the first skeleton image to obtain a first writing trajectory corresponding to the suspicious handwriting, and configured to perform handwriting tracking according to each of the second skeleton images to obtain second writing trajectories corresponding to each of the plurality of sample handwritings;

a feature extraction module, connected to the data acquisition module and the stroke order recognition module, respectively, configured to perform feature extraction on the corresponding first handwriting image according to the first writing trajectory to obtain a first dynamic feature of each pixel in the first writing trajectory, and configured to perform feature extraction on each of the corresponding second handwriting images according to the each of the second writing trajectories to obtain a second dynamic feature of each pixel in each of the second writing trajectories;

a first data processing module, connected to the feature extraction module, configured to obtain a correlation coefficient between the suspicious handwriting and each of the plurality of sample handwriting, according to the first dynamic feature corresponding to the suspicious handwriting and the second dynamic feature corresponding to the each of the plurality of sample handwriting; and a second data processing module, connected to the first data processing module, configured to process, according to a first probability density distribution data and a second probability density distribution data obtained in advance by using statistics and each of the correlation coefficients, to obtain an individual recognition result of the suspicious handwriting.

Preferably, the first data processing module further comprises:

a feature pair generating unit, configured to combine the first dynamic feature and each of the second dynamic features in pairs to generate a plurality of feature pairs;

a dynamic time warping unit, connected to the feature pair generating unit, configured to perform dynamic time warping between the first dynamic feature and the second dynamic feature in each of the plurality of feature pairs, so that strokes corresponding to the first dynamic feature and the corresponding parts thereof correspond to strokes corresponding to the second dynamic feature and the corresponding parts thereof; and a data computing unit, connected to the dynamic time warping unit, and configured to calculate a correlation coefficient between the first dynamic feature and the second dynamic feature in each of the plurality of feature pairs having subjected to the dynamic time warping.

Preferably, the dynamic time warping unit performs dynamic time warping between the first dynamic feature and the second dynamic feature in each of the plurality of feature pairs by using DTW technique, so that strokes corresponding to the first dynamic feature and the corresponding parts thereof correspond to strokes corresponding to the second dynamic feature and the corresponding parts thereof.

Preferably, the second data processing module further comprises:

a first data processing unit, configured to perform mean value processing on all of the correlation coefficients corresponding to the suspicious handwriting, to obtain a mean value correlation coefficient corresponding to the suspicious handwriting;

a second data processing unit, connected to the first data processing unit, configured to calculate a first probability of the mean value correlation coefficient in the first probability density distribution data, and configured to calculate a second probability of the mean value correlation coefficient in the second probability density distribution data;

wherein the first probability refers to a probability that the suspicious handwriting corresponding to the mean value correlation coefficient and the sample handwriting are written by the same person, and the second probability refers to a probability that the suspicious handwriting corresponding to the mean value correlation coefficient and the sample handwriting are not written by the same person;

a third data processing unit, connected to the second data processing unit, and configured to calculate a ratio of the first probability to the second probability to obtain a likelihood ratio of the suspicious handwriting; and a result judgment module, connected to the third data processing unit, and configured to perform matching in a preset likelihood ratio scale according to the likelihood ratio, to obtain an individual recognition result of the suspicious handwriting.

Preferably, the first probability density distribution data refers to a probability density distribution of correlation coefficients between two real sample handwritings written by the same person, and the second probability density distribution data refers to a probability density distribution of correlation coefficients between each of a plurality of others' handwriting written by others based on his/her real sample handwriting and the real sample handwriting.

Preferably, others' handwriting comprising allograph handwriting, and/or writing facsimile handwriting, and/or copying handwriting.

Preferably, the image pre-processing method comprises removing a background, and/or filling up blankness in strokes, and/or smoothing the strokes, and/or image binarization.

Preferably, the first dynamic feature comprises a width, and/or a gray scale, and/or a radian.

Preferably, the second dynamic feature comprises a width, and/or a gray scale, and/or a radian.

An offline handwriting individual recognition method based on two-dimensional dynamic features, applied to any one of the offline handwriting individual recognition system mentioned above, the method comprising:

Step S1, obtaining, by the offline handwriting individual recognition system, a first handwriting image corresponding to suspicious handwriting, and obtaining second handwriting images corresponding to a plurality of sample handwriting;

Step S2, pre-processing, by the offline handwriting individual recognition system, the first handwriting image to obtain a first pre-processed image corresponding to the suspicious handwriting, and pre-processing each of the second handwriting images to obtain second pre-processed images corresponding to each of the plurality of sample handwriting;

Step S3, performing, by the offline handwriting individual recognition system, skeleton extraction on the first pre-processed image to obtain a first skeleton image corresponding to the suspicious handwriting, and performing skeleton extraction on each of the second pre-processed images to obtain second skeleton images corresponding to each of the plurality of sample handwriting;

wherein the first skeleton image and each of the second skeleton images have a line width of a single pixel;

Step S4, performing, by the offline handwriting individual recognition system, handwriting tracking according to the first skeleton image to obtain a first writing trajectory corresponding to the suspicious handwriting, and performing handwriting tracking according to each of the second skeleton images to obtain second writing trajectories corresponding to each of the plurality of sample handwriting;

Step S5, performing, by the offline handwriting individual recognition system, feature extraction on the corresponding first handwriting image according to the first writing trajectory to obtain a first dynamic feature of each pixel in the first writing trajectory, and performing feature extraction on each of the corresponding second handwriting images according to the each of the second writing trajectories to obtain a second dynamic feature of each pixel in each of the second writing trajectories;

Step S6, processing, by the offline handwriting individual recognition system, to obtain a correlation coefficient between the suspicious handwriting and each of the plurality of sample handwritings, according to the first dynamic feature corresponding to the suspicious handwriting and the second dynamic feature corresponding to the each of the plurality of sample handwritings; and Step S7, processing, by the offline handwriting individual recognition system, the suspicious handwriting, according to a first probability density distribution data and a second probability density distribution data obtained in advance by using statistics and each of the correlation coefficients, to obtain an individual recognition result of the suspicious handwriting.

Preferably, Step S6 further comprises:

Step S61, combining, by the offline handwriting individual recognition system, the first dynamic feature and each of the second dynamic features in pairs to generate a plurality of feature pairs;

Step S62, performing, by the offline handwriting individual recognition system, dynamic time warping between the first dynamic feature and the second dynamic feature in each of the plurality of feature pairs, respectively, so that strokes corresponding to the first dynamic feature and the corresponding parts thereof correspond to strokes corresponding to the second dynamic feature and the corresponding parts thereof; and Step S63, calculating, by the offline handwriting individual recognition system, a correlation coefficient between the first dynamic feature and the second dynamic feature in each of the plurality of feature pairs having subjected to the dynamic time warping.

Preferably, in Step S62, performing dynamic time warping between the first dynamic feature and the second dynamic feature in each of the plurality of feature pairs by using DTW technique, so that strokes corresponding to the first dynamic feature and the corresponding parts thereof correspond to strokes corresponding to the second dynamic feature and the corresponding parts thereof.

Preferably, Step S7 further comprises:

Step S71, performing a mean value processing, by the offline handwriting individual recognition system, on all of the correlation coefficients corresponding to the suspicious handwriting to obtain a mean value correlation coefficient corresponding to the suspicious handwriting;

Step S72, calculating, by the offline handwriting individual recognition system, a first probability of the mean value correlation coefficient in the first probability density distribution data, and calculating a second probability of the mean value correlation coefficient in the second probability density distribution data;

wherein the first probability refers to a probability that the suspicious handwriting corresponding to the mean value correlation coefficient and the sample handwriting are written by the same person, and the second probability refers to a probability that the suspicious handwriting corresponding to the mean value correlation coefficient and the sample handwriting are not written by the same person;

Step S73, calculating, by the offline handwriting individual recognition system, a ratio of the first probability to the second probability to obtain a likelihood ratio of the suspicious handwriting; and Step S74, performing, by the offline handwriting individual recognition system, matching in a preset likelihood ratio scale according to the likelihood ratio to obtain an individual recognition result of the suspicious handwriting.

By adopting the above-mentioned technical solutions, the present invention has the following beneficial effects.

1. Handwriting images of the suspicious handwriting and the sample handwriting may be obtained by using a two-dimensional scanning equipment. In addition, the image pre-processing technology effectively removes the interference from factors, such as paper background, adapts to the writing result of writing tools having different thicknesses, and improves compatibility with different objects to be detected.

2. The automatic extraction of features excludes the participation of human subjective factors to the greatest extent, avoids the interference of human factors from the source, and effectively improves the accuracy of recognition.

3. The correlation coefficient between the suspicious handwriting and the sample handwriting is further processed by the probability density distribution obtained in advance by using statistics, which further improves the recognition accuracy.

BRIEF DESCRIPTION OF THE DRAWINGS

FIG. 3 is a schematic diagram of a likelihood ratio scale in a preferred embodiment of the present invention;

DETAILED DESCRIPTION

Figure 1:
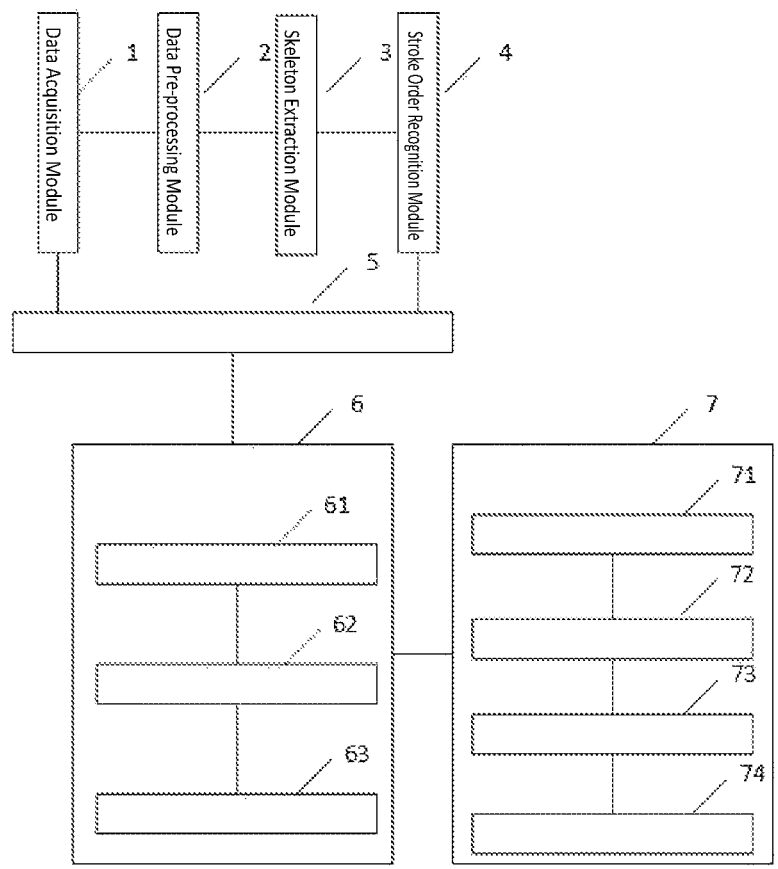
FIG. 1 is a schematic diagram of an offline handwriting individual recognition system based on two-dimensional dynamic features in a preferred embodiment of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

In a preferred embodiment of the present invention, given that the foregoing problems exist in the prior art, the present invention provides an offline handwriting individual recognition system based on two-dimensional dynamic features, as shown in FIG. 1, the system comprising:

a data acquisition module 1, configured to obtain a first handwriting image corresponding to suspicious handwriting, and configured to obtain second handwriting images corresponding to a plurality of sample handwriting;

a data pre-processing module 2, connected to the data acquisition module 1, configured to pre-process the first handwriting image to obtain a first pre-processed image corresponding to the suspicious handwriting, and configured to pre-process each of the second handwriting images to obtain second pre-processed images corresponding to each of the plurality of sample handwritings;

a skeleton extraction module 3, connected to the data pre-processing module 2, configured to perform skeleton extraction on the first pre-processed image to obtain a first skeleton image corresponding to the suspicious handwriting; and configured to perform skeleton extraction on each of the second pre-processed images to obtain second skeleton images corresponding to each of the plurality of sample handwritings;

wherein the first skeleton image and each of the second skeleton images have a line width of a single pixel;

a stroke order recognition module 4, connected to the skeleton extraction module 3, configured to perform handwriting tracking according to the first skeleton image to obtain a first writing trajectory corresponding to the suspicious handwriting, and configured to perform handwriting tracking according to each of the second skeleton images to obtain second writing trajectories corresponding to each of the plurality of sample handwritings;

a feature extraction module 5, connected to the data acquisition module 1 and the stroke order recognition module 4, respectively, configured to perform feature extraction on the corresponding first handwriting image according to the first writing trajectory to obtain a first dynamic feature of each pixel in the first writing trajectory, and configured to perform feature extraction on each of the corresponding second handwriting images according to the each of the second writing trajectories to obtain a second dynamic feature of each pixel in each of the second writing trajectories;

a first data processing module 6, connected to the feature extraction module 5, configured to obtain a correlation coefficient between the suspicious handwriting and each of the plurality of sample handwriting, according to the first dynamic feature corresponding to the suspicious handwriting and the second dynamic feature corresponding to the each of the plurality of sample handwriting; and a second data processing module 7, connected to the first data processing module 6, configured to process, according to a first probability density distribution data and a second probability density distribution data obtained in advance by using statistics and each of the correlation coefficients, to obtain an individual recognition result of the suspicious handwriting.

Figure 2:
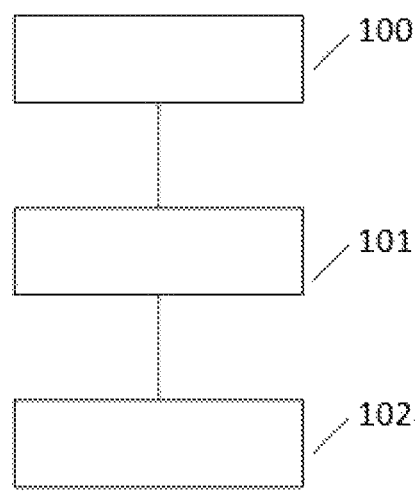
FIG. 2 is a schematic diagram of an offline handwriting individual recognition system based on two-dimensional dynamic features in a preferred embodiment of the present invention.

Specifically, in this embodiment, as shown in FIG. 2, the offline handwriting individual recognition system based on two-dimensional dynamic features provided in the invention comprises a scanner 100, a processor 101 connected to the scanner 100, and a human-computer interaction device 102 connected to the processor 101. In this embodiment, the data acquisition module 1 is the scanner 100; the processor 101 comprises the data pre-processing module 2, the skeleton extraction module 3, the stroke order recognition module 4, the feature extraction module 5, the first data processing module 6, and the second data processing module 7; the human-computer interaction device 102 comprises, but is not limited to, mouse, electronic pens or touch screens.

Preferably, the scanner 100 is a large-scale optical two-dimensional topography scanning instrument. First of all, the large-area optical two-dimensional topography scanning instrument is used for scanning operation. Specifically, each suspicious handwriting and sample handwriting to be detected are sequentially placed on a objective table of the large-area optical two-dimensional topography scanning instrument; after scanning operation is completed, a computer connected to the large-area optical two-dimensional topography scanning instrument acquires a first handwriting image corresponding to a suspicious handwriting and a second handwriting image corresponding to each of the plurality of sample handwritings. Then performing image pre-processing on the first handwriting image and the second handwriting image to obtain a first pre-processed image corresponding to the first handwriting image and a second pre-processed image corresponding to the second handwriting image, respectively. The image pre-processing method comprises removing a background, and/or filling up blankness in strokes, and/or smoothing the strokes, and/or image binarization. In this embodiment, the first handwriting image corresponding to the suspicious handwriting and the second handwriting image corresponding to each of the plurality of sample handwritings may be obtained by capturing the suspicious handwriting and the plurality of sample handwriting with a camera.

In this embodiment, the suspicious handwriting and the sample handwriting are processed in a similar way by the processor 101, so by way of example, the processing steps for the suspicious handwriting is illustrated herein, and the processing steps for the sample handwriting will not be repeated herein. The processing steps for the suspicious handwriting are as follows:

extracting a skeleton corresponding to the suspicious handwriting form the first pre-processed image to obtain a first skeleton image corresponding to the suspicious handwriting, and obtaining a first writing trajectory corresponding to the suspicious handwriting by performing handwriting tracking on the first skeleton image. The handwriting tracking process is preferably performed by the human-computer interaction device 102 in the form of human-machine interaction, and the process further comprises:

first of all, the mouse, the electronic pen, or the touch screen is used to click near the starting position of the stroke on the first skeleton image to automatically obtain the starting point of the stroke, and then to track along a direction of the stroke; if the stroke currently being tracked is wrong or misoperation occurs due to human factors, the currently tracked stroke may be cancelled, so as to return to the previous stroke and continue to track the strokes until track down to each stroke of the first skeleton image; finally, the first writing trajectory is obtained.

Furthermore, first dynamic features of each pixel in the first writing trajectory are obtained on the first handwriting image according to the obtained first writing trajectory, wherein, the first dynamic features comprise stroke width, stroke gray scale, and stroke radian, etc. The above-mentioned first dynamic features serve as the two-dimensional dynamic features of the suspicious handwriting.

In this embodiment, the two-dimensional dynamic features of the sample handwriting are obtained by processing the sample handwriting according to the same processing process as described above. Then the correlation coefficient between the two-dimensional dynamic features of the suspicious handwriting and the two-dimensional dynamic features of the sample handwriting is calculated, and the similarity between the suspicious handwriting and the sample handwriting is characterized by the correlation coefficient. Specifically, the handwriting is formed by a continuous process, that is, even if the handwriting is written by the same person, each of the corresponding strokes has a different length since the writing speed for each stoke is not exactly the same, and sequence length corresponding to the handwriting is different, therefore, the same stroke may be displaced in the same sequence. Therefore, on a coordinate system with the sequence length as the horizontal axis, the sequence length of each stroke in the case where the two-dimensional dynamic features of the suspicious handwriting project on the coordinate system is not exactly the same as the sequence length of each stroke in the case where the two-dimensional dynamic features of the sample handwriting project on the coordinate system, so it is impossible to calculate the correlation coefficient between the two-dimensional dynamic features of the suspicious handwriting and the two-dimensional dynamic features of the sample handwriting. Therefore, it is required to perform dynamic time warping on a set of the two-dimensional dynamic features of the suspicious handwriting and the two-dimensional dynamic features of the sample handwriting which need to be calculated for the correlation coefficient in prior to calculating the correlation coefficient. In this embodiment, the dynamic time warping is processed by using DTW technique, so that strokes corresponding to the two-dimensional dynamic features of the suspicious handwriting and the corresponding parts thereof correspond to strokes corresponding to the two-dimensional dynamic features of the sample handwriting and the corresponding parts thereof have a one-one correspondence for the same stroke, and the same stroke is the same in terms of the sequence length.

In this embodiment, after the similarity between the suspicious handwriting and the sample handwriting is obtained, the above-mentioned similarity, that is, the correlation coefficient, needs to be substituted into the probability density distribution obtained in advance by using statistics for further processing, in order to improve the recognition accuracy. During the process of handwriting recognition, when only one suspicious handwriting and one sample handwriting are obtained, the comparison result has only one correlation coefficient, and the correlation coefficient is the mean value correlation coefficient according to the present invention. It should be noted that a plurality of suspicious handwriting and a plurality of sample handwriting are obtained when the handwriting recognition is performed, for example, two suspicious handwriting and three sample handwritings.

The correlation coefficients are calculated for the two-dimensional dynamic features of the two suspicious handwriting and the two-dimensional dynamic features of the three sample handwritings, then calculation results corresponding to the three correlation coefficients are obtained for each suspicious handwriting.

In this embodiment, for each suspicious handwriting, it is not necessary to substitute all of the three correlation coefficients into the probability density distribution obtained in advance by using statistics for further processing. Instead, first of all, performing mean value processing on all of the three correlation coefficients to obtain a corresponding mean value correlation coefficient, than substituting the corresponding mean value correlation coefficient into the probability density distribution obtained in advance by using statistics for further processing.

In particular, the first probability density distribution data obtained in advance by using statistics refers to a probability density distribution of correlation coefficients between two real sample handwriting in a plurality of real sample handwriting written by the same person, and the second probability density distribution data refers to a probability density distribution of correlation coefficients between each of a plurality of others' handwriting written by others based on his/her real sample handwriting and real sample handwriting. In this embodiment, hundreds of thousands of handwriting data are acquired in advance, and a corresponding handwriting database is established according to the handwriting data. The handwriting data comprises a plurality of real sample handwritings written by the same person, that is, the handwriting of the writer. The handwriting data further comprises a plurality of others' handwritings obtained by imitating the real sample handwriting, that is, allograph handwriting, and/or writing facsimile handwriting, and/or copying handwriting obtained by imitating the ream handwriting. The correlation coefficients between two real handwriting are calculated separately, and the probability density distribution of the real handwriting is obtained according to the obtained correlation coefficients. The correlation coefficients between each of the others' handwritings and the real handwriting are calculated separately, and the probability density distribution of the others' handwriting is obtained according to the obtained correlation coefficients. Then, the mean value correlation coefficient of each suspicious handwriting obtained above is substituted into the probability density distribution of the real handwriting and the probability density distribution of others' handwritings to obtain the first probability that the suspicious handwriting and the sample handwriting are written by the same person, and to obtain the second probability that the suspicious handwriting and the sample handwriting are not written by the same person.

In this embodiment, the likelihood ratio of the suspicious handwriting is further calculated by the following formula:

$$SLR = \frac{\hat{g}[s(E_U, E_S)|H_p]}{\hat{g}[s(E_U, E_S)|H_d]}$$

wherein SLR represents the likelihood ratio of the suspicious handwriting, $H_p$ represents that the suspicious handwriting and the sample handwriting are written by the same person; $H_d$ represents that the suspicious handwriting and the sample handwriting are not written by the same person, $E_U$ represents the suspicious handwriting, and $E_S$ represents the sample handwriting.

In this embodiment, as shown in FIG. 3, a preset likelihood ratio scale is provided. The calculation result of the likelihood ratio is matched with the likelihood ratio scale, if the likelihood ratio is greater than 10,000, it shows us an individual recognition result that there is a high probability that the suspicious handwriting and the sample handwriting are written by the same person; if the likelihood ratio is less than 0.001, it shows us an individual recognition result that there is a high probability that the suspicious handwriting and the sample handwriting are not written by the same person, and so on.

In a preferred embodiment of the present invention, the first data processing module 6 further comprises:

a feature pair generating unit 61, configured to combine the first dynamic feature and each of the second dynamic features in pairs to generate a plurality of feature pairs;

a dynamic time warping unit 62, connected to the feature pair generating unit 61, configured to perform dynamic time warping between the first dynamic feature and the second dynamic feature in each of the plurality of feature pairs, so that strokes corresponding to the first dynamic feature and the corresponding parts thereof correspond to strokes corresponding to the second dynamic feature and the corresponding parts thereof; and a data computing unit 63, connected to the dynamic time warping unit 62, and configured to calculate a correlation coefficient between the first dynamic feature and the second dynamic feature in each of the plurality of feature pairs having subjected to the dynamic time warping.

In a preferred embodiment of the present invention, the dynamic time warping unit 62 performs dynamic time warping between the first dynamic feature and the second dynamic feature in each of the plurality of feature pairs by using DTW technique, so that strokes corresponding to the first dynamic feature and the corresponding parts thereof correspond to strokes corresponding to the second dynamic feature and the corresponding parts thereof.

In a preferred embodiment of the present invention, the second data processing module 7 further comprises:

a first data processing unit 71, configured to perform mean value processing on all of the correlation coefficients corresponding to the suspicious handwriting, to obtain a mean value correlation coefficient corresponding to the suspicious handwriting;

a second data processing unit 72, connected to the first data processing unit 71, configured to calculate a first probability of the mean value correlation coefficient in the first probability density distribution data, and configured to calculate a second probability of the mean value correlation coefficient in the second probability density distribution data;

wherein the first probability refers to a probability that the suspicious handwriting corresponding to the mean value correlation coefficient and the sample handwriting are written by the same person, and the second probability refers to a probability that the suspicious handwriting corresponding to the mean value correlation coefficient and the sample handwriting are not written by the same person;

a third data processing unit 73, connected to the second data processing unit 72, and configured to calculate a ratio of the first probability to the second probability to obtain a likelihood ratio of the suspicious handwriting; and a result judgment module 74, connected to the third data processing unit 73, and configured to perform matching in a preset likelihood ratio scale according to the likelihood ratio, to obtain an individual recognition result of the suspicious handwriting.

In a preferred embodiment of the present invention, the first probability density distribution data refers to a probability density distribution of correlation coefficients between two real sample handwriting written by the same person, and the second probability density distribution data refers to a probability density distribution of correlation coefficients between a plurality of others' handwriting written by others based on his/her real sample handwriting and real sample handwriting.

In a preferred embodiment of the present invention, others' handwriting comprising allograph handwriting, and/or writing facsimile handwriting, and/or copying handwriting.

In a preferred embodiment of the present invention, the image pre-processing method comprises removing a background, and/or filling up blankness in strokes, and/or smoothing the strokes, and/or image binarization.

In a preferred embodiment of the present invention, the first dynamic feature comprises a width, and/or a gray scale, and/or a radian.

In a preferred embodiment of the present invention, the second dynamic feature comprises a width, and/or a gray scale, and/or a radian.

Figure 4:
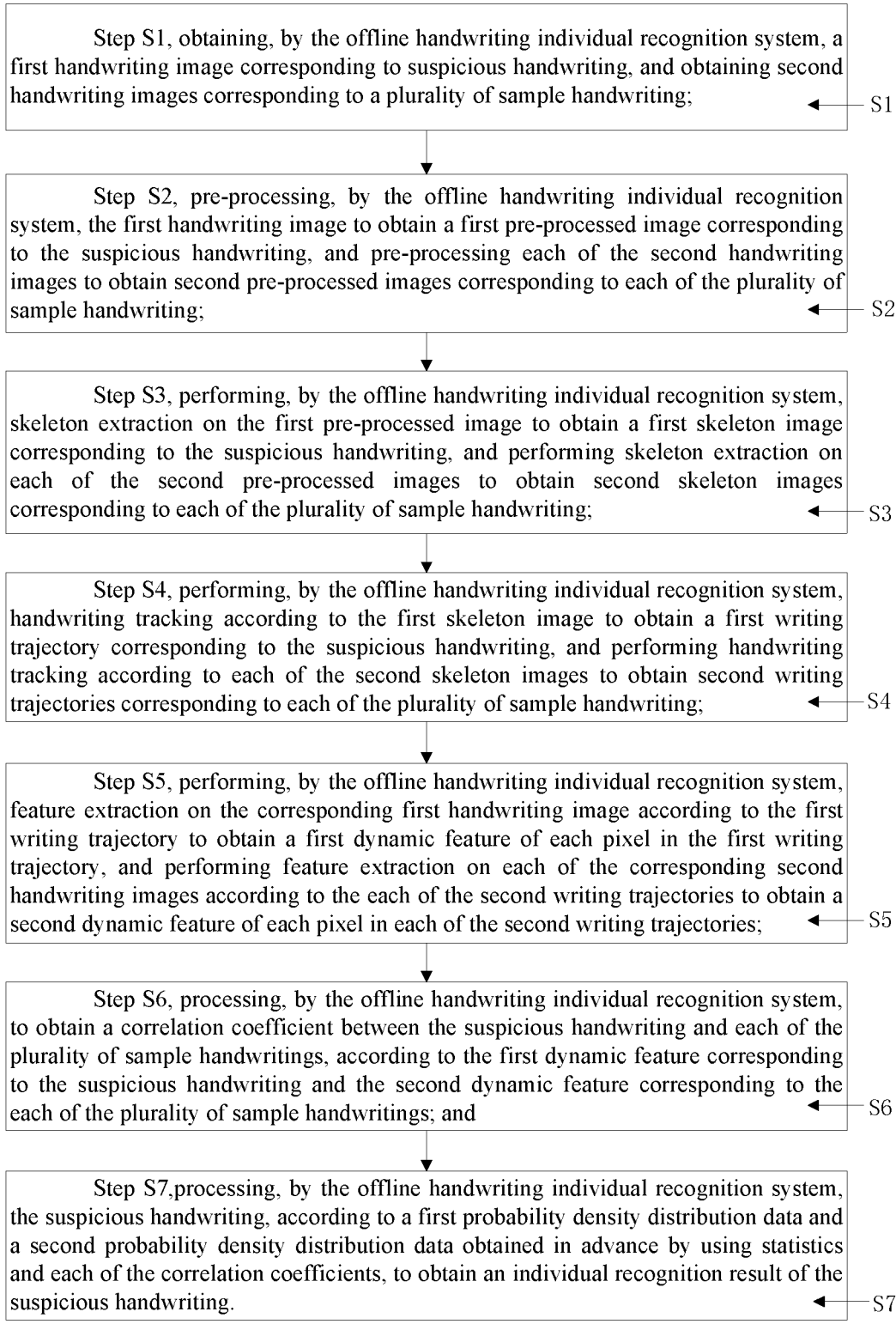
FIG. 4 is a flowchart of an offline handwriting individual recognition method based on two-dimensional dynamic features in a preferred embodiment of the present invention.

An offline handwriting individual recognition method based on two-dimensional dynamic features, applied to any one of the offline handwriting individual recognition system mentioned above, as shown in FIG. 4, the method comprising:

Step S1, obtaining, by the offline handwriting individual recognition system, a first handwriting image corresponding to suspicious handwriting, and obtaining second handwriting images corresponding to a plurality of sample handwriting;

Step S2, pre-processing, by the offline handwriting individual recognition system, the first handwriting image to obtain a first pre-processed image corresponding to the suspicious handwriting, and pre-processing each of the second handwriting images to obtain second pre-processed images corresponding to each of the plurality of sample handwriting;

Step S3, performing, by the offline handwriting individual recognition system, skeleton extraction on the first pre-processed image to obtain a first skeleton image corresponding to the suspicious handwriting, and performing skeleton extraction on each of the second pre-processed images to obtain second skeleton images corresponding to each of the plurality of sample handwriting;

wherein the first skeleton image and each of the second skeleton images have a line width of a single pixel;

Step S4, performing, by the offline handwriting individual recognition system, handwriting tracking according to the first skeleton image to obtain a first writing trajectory corresponding to the suspicious handwriting, and performing handwriting tracking according to each of the second skeleton images to obtain second writing trajectories corresponding to each of the plurality of sample handwriting;

Step S5, performing, by the offline handwriting individual recognition system, feature extraction on the corresponding first handwriting image according to the first writing trajectory to obtain a first dynamic feature of each pixel in the first writing trajectory, and performing feature extraction on each of the corresponding second handwriting images according to the each of the second writing trajectories to obtain a second dynamic feature of each pixel in each of the second writing trajectories;

Step S6, processing, by the offline handwriting individual recognition system, to obtain a correlation coefficient between the suspicious handwriting and each of the plurality of sample handwritings, according to the first dynamic feature corresponding to the suspicious handwriting and the second dynamic feature corresponding to the each of the plurality of sample handwritings; and Step S7, processing, by the offline handwriting individual recognition system, the suspicious handwriting, according to a first probability density distribution data and a second probability density distribution data obtained in advance by using statistics and each of the correlation coefficients, to obtain an individual recognition result of the suspicious handwriting.

Figure 5:
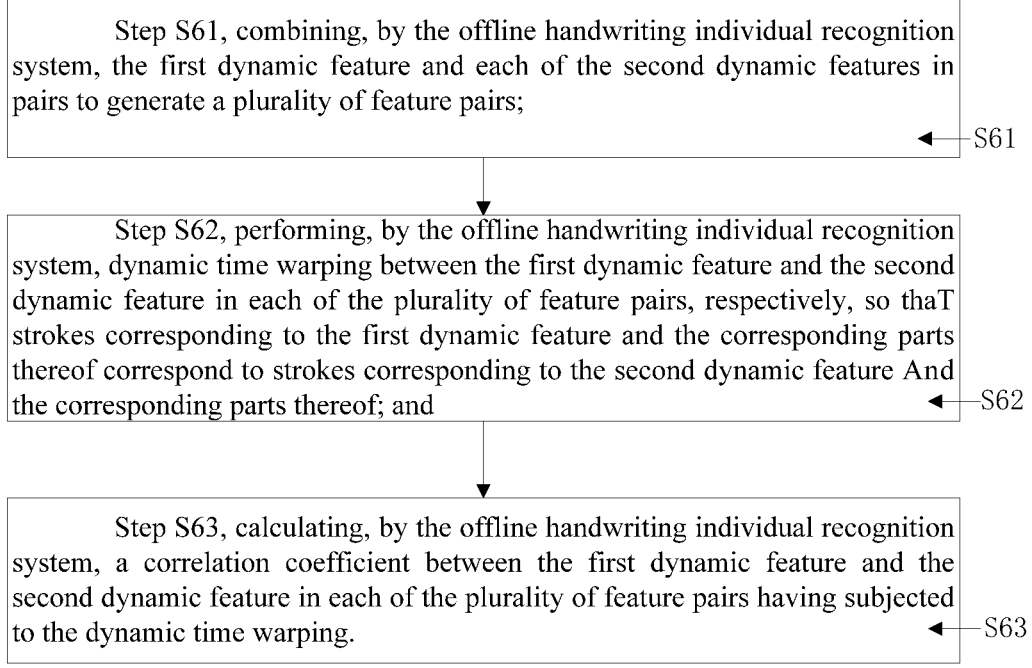
FIG. 5 is a sub-flowchart of an offline handwriting individual recognition method based on two-dimensional dynamic features in a preferred embodiment of the present invention.

In a preferred embodiment of the present invention, as shown in FIG. 5, Step S6 further comprises:

Step S61, combining, by the offline handwriting individual recognition system, the first dynamic feature and each of the second dynamic features in pairs to generate a plurality of feature pairs;

Step S62, performing, by the offline handwriting individual recognition system, dynamic time warping between the first dynamic feature and the second dynamic feature in each of the plurality of feature pairs, respectively, so that strokes corresponding to the first dynamic feature and the corresponding parts thereof correspond to strokes corresponding to the second dynamic feature and the corresponding parts thereof; and Step S63, calculating, by the offline handwriting individual recognition system, a correlation coefficient between the first dynamic feature and the second dynamic feature in each of the plurality of feature pairs having subjected to the dynamic time warping.

In a preferred embodiment of the present invention, the dynamic time warping unit 62 performs dynamic time warping between the first dynamic feature and the second dynamic feature in each of the plurality of feature pairs by using DTW technique, so that strokes corresponding to the first dynamic feature and the corresponding parts thereof correspond to strokes corresponding to the second dynamic feature and the corresponding parts thereof.

Figure 6:
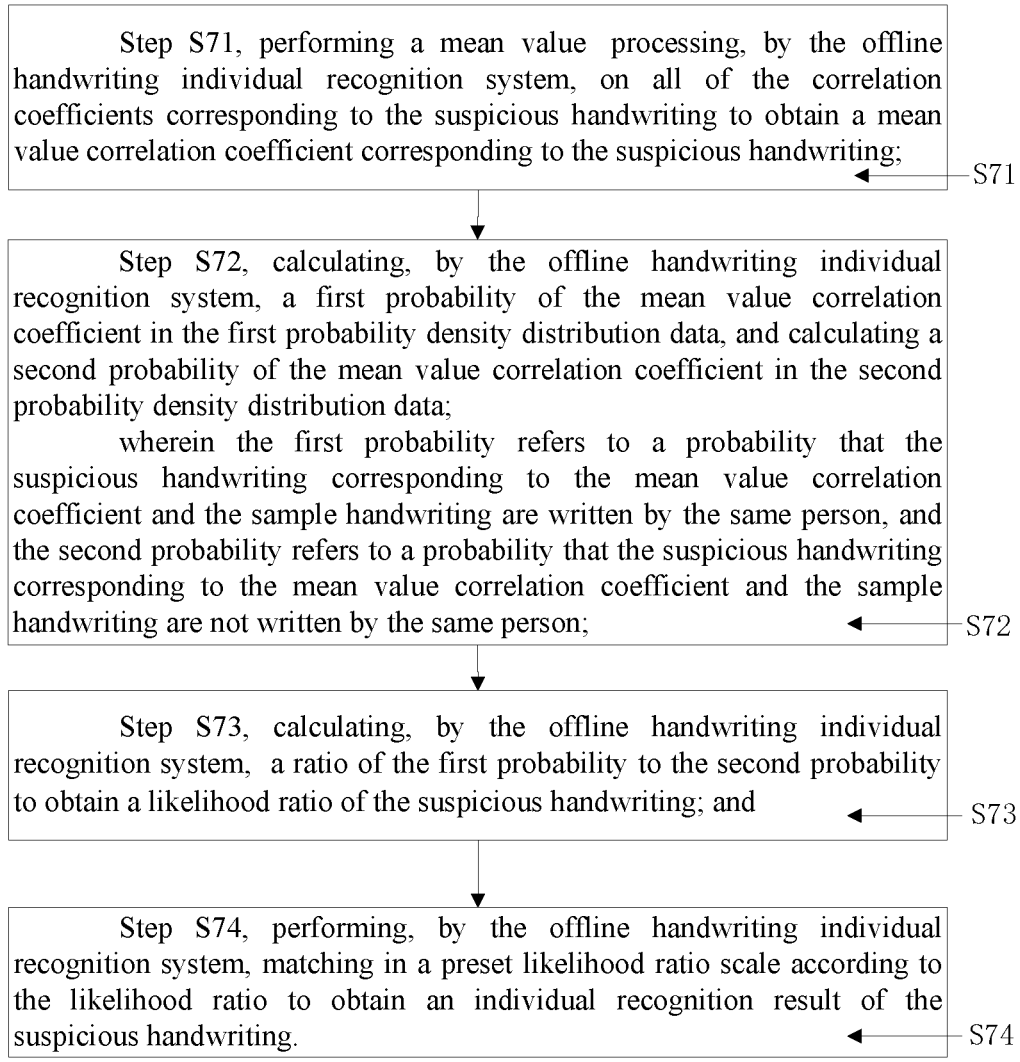
FIG. 6 is a sub-flowchart of an offline handwriting individual recognition method based on two-dimensional dynamic features in a preferred embodiment of the present invention.

In a preferred embodiment of the present invention, as shown in FIG. 6, Step S7 further comprises:

Step S71, performing a mean value processing, by the offline handwriting individual recognition system, on all of the correlation coefficients corresponding to the suspicious handwriting to obtain a mean value correlation coefficient corresponding to the suspicious handwriting;

Step S72, calculating, by the offline handwriting individual recognition system, a first probability of the mean value correlation coefficient in the first probability density distribution data, and calculating a second probability of the mean value correlation coefficient in the second probability density distribution data;

wherein the first probability refers to a probability that the suspicious handwriting corresponding to the mean value correlation coefficient and the sample handwriting are written by the same person, and the second probability refers to a probability that the suspicious handwriting corresponding to the mean value correlation coefficient and the sample handwriting are not written by the same person;

Step S73, calculating, by the offline handwriting individual recognition system, a ratio of the first probability to the second probability to obtain a likelihood ratio of the suspicious handwriting; and Step S74, performing, by the offline handwriting individual recognition system, matching in a preset likelihood ratio scale according to the likelihood ratio to obtain an individual recognition result of the suspicious handwriting.

The above descriptions are only the preferred embodiments of the invention, not thus limiting the embodiments and scope of the invention. Those skilled in the art should be able to realize that the schemes obtained from the content of specification and drawings of the invention are within the scope of the invention.

What is claimed is:

1. An offline handwriting individual recognition system based on two-dimensional dynamic features, comprising:
   a data acquisition module, configured to obtain a first handwriting image corresponding to suspicious handwriting, and configured to obtain second handwriting images corresponding to a plurality of sample handwriting;
   a data pre-processing module, connected to the data acquisition module, configured to pre-process the first handwriting image to obtain a first pre-processed image corresponding to the suspicious handwriting, and configured to pre-process each of the second handwriting images to obtain second pre-processed images corresponding to each of the plurality of sample handwritings;
   a skeleton extraction module, connected to the data pre-processing module, configured to perform skeleton extraction on the first pre-processed image to obtain a first skeleton image corresponding to the suspicious handwriting; and configured to perform skeleton extraction on each of the second pre-processed images to obtain second skeleton images corresponding to each of the plurality of sample handwritings;
   wherein the first skeleton image and each of the second skeleton images have a line width of a single pixel;
   a stroke order recognition module, connected to the skeleton extraction module, configured to perform handwriting tracking according to the first skeleton image to obtain a first writing trajectory corresponding to the suspicious handwriting, and configured to perform handwriting tracking according to each of the second skeleton images to obtain second writing trajectories corresponding to each of the plurality of sample handwritings;
   a feature extraction module, connected to the data acquisition module and the stroke order recognition module, respectively, configured to perform feature extraction on the corresponding first handwriting image according to the first writing trajectory to obtain a first dynamic feature of each pixel in the first writing trajectory, and configured to perform feature extraction on each of the corresponding second handwriting images according to the each of the second writing trajectories to obtain a second dynamic feature of each pixel in each of the second writing trajectories;
   a first data processing module, connected to the feature extraction module, configured to obtain a correlation coefficient between the suspicious handwriting and each of the plurality of sample handwriting, according to the first dynamic feature corresponding to the suspicious handwriting and the second dynamic feature corresponding to the each of the plurality of sample handwriting; and
   a second data processing module, connected to the first data processing module, configured to process, according to a first probability density distribution data and a second probability density distribution data obtained in advance by using statistics and each of the correlation coefficients, to obtain an individual recognition result of the suspicious handwriting.

2. The offline handwriting individual recognition system of claim 1, wherein the first data processing module further comprises:
   a feature pair generating unit, configured to combine the first dynamic feature and each of the second dynamic features in pairs to generate a plurality of feature pairs;
   a dynamic time warping unit, connected to the feature pair generating unit, configured to perform dynamic time warping between the first dynamic feature and the second dynamic feature in each of the plurality of feature pairs, so that strokes corresponding to the first dynamic feature and the corresponding parts thereof correspond to strokes corresponding to the second dynamic feature and the corresponding parts thereof; and
   a data computing unit, connected to the dynamic time warping unit, and configured to calculate a correlation coefficient between the first dynamic feature and the second dynamic feature in each of the plurality of feature pairs having subjected to the dynamic time warping.

3. The offline handwriting individual recognition system of claim 1, wherein the second data processing module further comprises:
   a first data processing unit, configured to perform mean value processing on all of the correlation coefficients corresponding to the suspicious handwriting, to obtain a mean value correlation coefficient corresponding to the suspicious handwriting;
   a second data processing unit, connected to the first data processing unit, configured to calculate a first probability of the mean value correlation coefficient in the first probability density distribution data, and configured to calculate a second probability of the mean value correlation coefficient in the second probability density distribution data;
   wherein the first probability refers to a probability that the suspicious handwriting corresponding to the mean value correlation coefficient and the sample handwriting are written by the same person, and the second probability refers to a probability that the suspicious handwriting corresponding to the mean value correlation coefficient and the sample handwriting are not written by the same person;
   a third data processing unit, connected to the second data processing unit, and configured to calculate a ratio of the first probability to the second probability to obtain a likelihood ratio of the suspicious handwriting; and
   a result judgment module, connected to the third data processing unit, and configured to perform matching in a preset likelihood ratio scale according to the likelihood ratio, to obtain an individual recognition result of the suspicious handwriting.

4. The offline handwriting individual recognition system of claim 3, wherein the first probability density distribution data refers to a probability density distribution of correlation coefficients between two real sample handwritings written by the same person, and
   the second probability density distribution data refers to a probability density distribution of correlation coefficients between each of a plurality of others' handwriting written by others based on his/her real sample handwriting and the real sample handwriting.

5. The offline handwriting individual recognition system of claim 4, wherein others' handwriting comprising allograph handwriting, and/or writing facsimile handwriting, and/or copying handwriting.

6. The offline handwriting individual recognition system of claim 1, wherein the image pre-processing method comprises removing a background, and/or filling up blankness in strokes, and/or smoothing the strokes, and/or image binarization.

7. The offline handwriting individual recognition system of claim 1, wherein the first dynamic feature comprises a width, and/or a gray scale, and/or a radian.

8. The offline handwriting individual recognition system of claim 1, wherein the second dynamic feature comprises a width, and/or a gray scale, and/or a radian.

9. An offline handwriting individual recognition method based on two-dimensional dynamic features, applied to the offline handwriting individual recognition system of claim 1, the method comprising the steps of:
   obtaining, by the offline handwriting individual recognition system, a first handwriting image corresponding to suspicious handwriting, and obtaining second handwriting images corresponding to a plurality of sample handwriting;
   pre-processing, by the offline handwriting individual recognition system, the first handwriting image to obtain a first pre-processed image corresponding to the suspicious handwriting, and pre-processing each of the second handwriting images to obtain second pre-processed images corresponding to each of the plurality of sample handwriting;
   performing, by the offline handwriting individual recognition system, skeleton extraction on the first pre-processed image to obtain a first skeleton image corresponding to the suspicious handwriting, and performing skeleton extraction on each of the second pre-processed images to obtain second skeleton images corresponding to each of the plurality of sample handwriting; wherein the first skeleton image and each of the second skeleton images have a line width of a single pixel;
   performing, by the offline handwriting individual recognition system, handwriting tracking according to the first skeleton image to obtain a first writing trajectory corresponding to the suspicious handwriting, and performing handwriting tracking according to each of the second skeleton images to obtain second writing trajectories corresponding to each of the plurality of sample handwriting;
   performing, by the offline handwriting individual recognition system, feature extraction on the corresponding first handwriting image according to the first writing trajectory to obtain a first dynamic feature of each pixel in the first writing trajectory, and performing feature extraction on each of the corresponding second handwriting images according to the each of the second writing trajectories to obtain a second dynamic feature of each pixel in each of the second writing trajectories;
   processing, by the offline handwriting individual recognition system, to obtain a correlation coefficient between the suspicious handwriting and each of the plurality of sample handwritings, according to the first dynamic feature corresponding to the suspicious handwriting and the second dynamic feature corresponding to the each of the plurality of sample handwriting; and
   processing, by the offline handwriting individual recognition system, the suspicious handwriting, according to a first probability density distribution data and a second probability density distribution data obtained in advance by using statistics and each of the correlation coefficients, to obtain an individual recognition result of the suspicious handwriting.

10. The offline handwriting individual recognition method of claim 9, wherein the step of processing to obtain a correlation coefficient between the suspicious handwriting and each of the plurality of sample handwriting further comprises:
   combining, by the offline handwriting individual recognition system, the first dynamic feature and each of the second dynamic features in pairs to generate a plurality of feature pairs;
   performing, by the offline handwriting individual recognition system, dynamic time warping between the first dynamic feature and the second dynamic feature in each of the plurality of feature pairs, respectively, so that strokes corresponding to the first dynamic feature and the corresponding parts thereof correspond to strokes corresponding to the second dynamic feature and the corresponding parts thereof, and
   calculating, by the offline handwriting individual recognition system, a correlation coefficient between the first dynamic feature and the second dynamic feature in each of the plurality of feature pairs having subjected to the dynamic time warping.

11. The offline handwriting individual recognition method of claim 9, wherein the step of processing to obtain an individual recognition result of the suspicious handwriting further comprises:

performing a mean value processing, by the offline handwriting individual recognition system, on all of the correlation coefficients corresponding to the suspicious handwriting to obtain a mean value correlation coefficient corresponding to the suspicious handwriting;

calculating, by the offline handwriting individual recognition system, a first probability of the mean value correlation coefficient in the first probability density distribution data, and calculating a second probability of the mean value correlation coefficient in the second probability density distribution data;

wherein the first probability refers to a probability that the suspicious handwriting corresponding to the mean value correlation coefficient and the sample handwriting are written by the same person, and the second probability refers to a probability that the suspicious handwriting corresponding to the mean value correlation coefficient and the sample handwriting are not written by the same person;

calculating, by the offline handwriting individual recognition system, a ratio of the first probability to the second probability to obtain a likelihood ratio of the suspicious handwriting; and performing, by the offline handwriting individual recognition system, matching in a preset likelihood ratio scale according to the likelihood ratio to obtain an individual recognition result of the suspicious handwriting.

12. The offline handwriting individual recognition method of claim 11, wherein performing dynamic time warping between the first dynamic feature and the second dynamic feature in each of the plurality of feature pairs by using DTW technique, so that strokes corresponding to the first dynamic feature and the corresponding parts thereof correspond to strokes corresponding to the second dynamic feature and the corresponding parts thereof.

13. The offline handwriting individual recognition system of claim 1, wherein the dynamic time warping unit performs dynamic time warping between the first dynamic feature and the second dynamic feature in each of the plurality of feature pairs by using DTW technique, so that strokes corresponding to the first dynamic feature and the corresponding parts thereof correspond to strokes corresponding to the second dynamic feature and the corresponding parts thereof.

* * * * *